United States Patent [19]

Nishihata

[11] 4,178,488
[45] Dec. 11, 1979

[54] TELEPHONE SET

[75] Inventor: Yukihiro Nishihata, Kobe, Japan

[73] Assignee: TOA Electric Co., Ltd., Japan

[21] Appl. No.: 924,831

[22] Filed: Jul. 14, 1978

[30] Foreign Application Priority Data

Aug. 2, 1977 [JP] Japan ................................ 52/93212
Aug. 3, 1977 [JP] Japan ........................ 52/104621[U]

[51] Int. Cl.$^2$ ...................... H04M 1/02; H04M 1/03; H04M 1/20
[52] U.S. Cl. ................................ 179/100 L; 179/103; 179/179
[58] Field of Search ........................... D14/53, 62, 64; 179/100 R, 100 D, 100 L, 103, 178, 179, 1 HF, 100 C

[56] References Cited

U.S. PATENT DOCUMENTS

| D. 234,849 | 4/1975 | Tyson et al. | D14/53 |
| 2,720,332 | 10/1955 | Holt | 179/103 |
| 3,521,008 | 7/1970 | Tyson | 179/100 C |
| 3,564,164 | 2/1971 | Prescott | 179/103 |
| 3,659,050 | 4/1972 | Carlson et al. | 179/100 L |

FOREIGN PATENT DOCUMENTS

| 2139207 | 2/1973 | Fed. Rep. of Germany | 179/100 R |
| 1372895 | 10/1963 | France | 179/103 |
| 1215958 | 12/1970 | United Kingdom | 179/100 D |

OTHER PUBLICATIONS

Popular Science; Sep. 1976; p. 86.

*Primary Examiner*—Kathleen H. Claffy
*Assistant Examiner*—Randall P. Myers
*Attorney, Agent, or Firm*—Wenderoth, Lind & Ponack

[57] ABSTRACT

A telephone set has a transmitter-receiver including a first portion for mounting a microphone, a second portion for mounting a speaker for loudspeaking, an earphone for low speaking with an opening formed in the first portion so that the side walls of the opening connect the microphone to the second portion without acoustic coupling between the first and second portions, and a base member shaped to support the transmitter-receiver. The base member has a telephone number operating board which is accessible through the opening in the first portion when the transmitter-receiver is positioned on the base member. A mechanical switch on the base member responds to the placement of the transmitter-receiver to effect switching between the loudspeaking and lowspeaking modes of operation. Also disclosed is a microphone support member which can support the microphone without exerting any adverse effect on the characteristics thereof.

9 Claims, 10 Drawing Figures

TELEPHONE SET

BACKGROUND OF THE INVENTION

This invention relates to a telephone set, and more particularly to a loudspeaking and lowspeaking telephone set which prevents howling due to the sound coupling of a microphone and a speaker through the inner side of a transmitter-receiver casing and wherein the operation of loudspeaking and lowspeaking can be effected very easily.

In most generally used telephone sets there are many disadvantages. For example, the microphone and speaker are interconnected through the interior of the transmitter-receiver, making it easy to bring about a howling phenomenon due to the sound coupling of the two, and, further, it is not possible to switch between "lowspeaking" (one person holding the receiver of a handheld transmitter-receiver to his ear) and "loudspeaking" (a general broadcasting of sound from the receiver to the surrounding area). In order to eliminate these disadvantages, telephone sets have been developed which can effect both this loudspeaking and ordinary lowspeaking. These telephone sets are the so-called "integral type" in which a handset and a main telephone set body are integrated and the "separate type" in which the two are separated. There are, however, disadvantages with these telephone sets. In the former integral type, the set is compact, but the telephone number buttons cannot be operated during lowspeaking when the main telephone set body (including a transmitter-receiver) is handled, and the latter separate type the telephone set becomes overly large.

BRIEF SUMMARY OF THE INVENTION

A main object of this invention is to provide a telephone set which can be used conveniently for both loudspeaking and lowspeaking.

Another object of this invention is to provide a telephone set of the type mentioned above in which acoustic coupling between the microphone and the speaker within a transmitter-receiver is eliminated.

A further object of this invention is to provide a telephone set which is small-sized and which can be manufactured easily.

In accordance with this invention, a telephone set is provided which includes a transmitter-receiver which is bent or inclined slightly downward from substantially the center thereof to define a first and a second portion on both sides of the bent portion. The transmitter-receiver is provided at the outer end part of the first portion with a microphone compartment and in the second portion with a speaker compartment. This telephone set further has an opening in the first portion, and both side walls of the opening connect the microphone compartment to the bent portion. A base member is shaped to support the entire transmitter-receiver, the base member having a telephone number operating board projecting from an inclined portion thereof. This operating board is accessible through the opening in the first portion when the transmitter-receiver is positioned on the base member.

BRIEF DESCRIPTION OF THE DRAWINGS

The above and other objects, features and advantages of the present invention will become more readily apparent from the following description, reference being made to the accompanying drawings in which.

DETAILED DESCRIPTION OF THE PREFERRED EMBODIMENT

Figure 1:
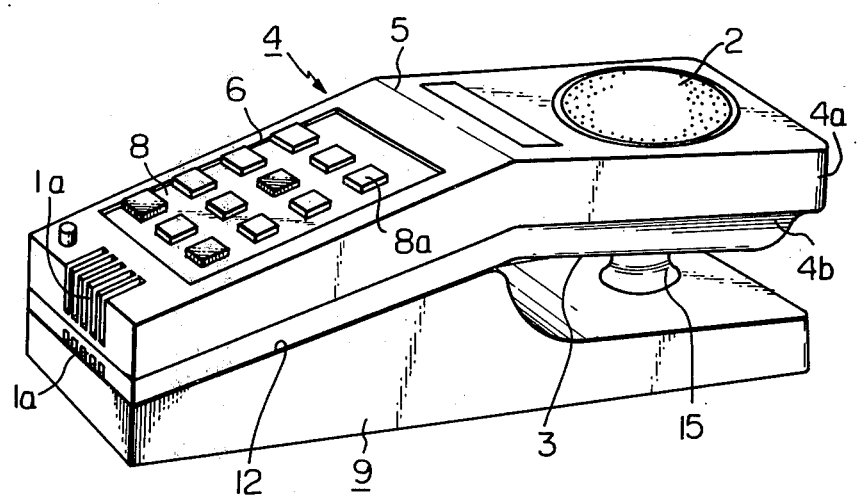
FIG. 1 is a perspective view of one embodiment of this invention.
Figure 2:
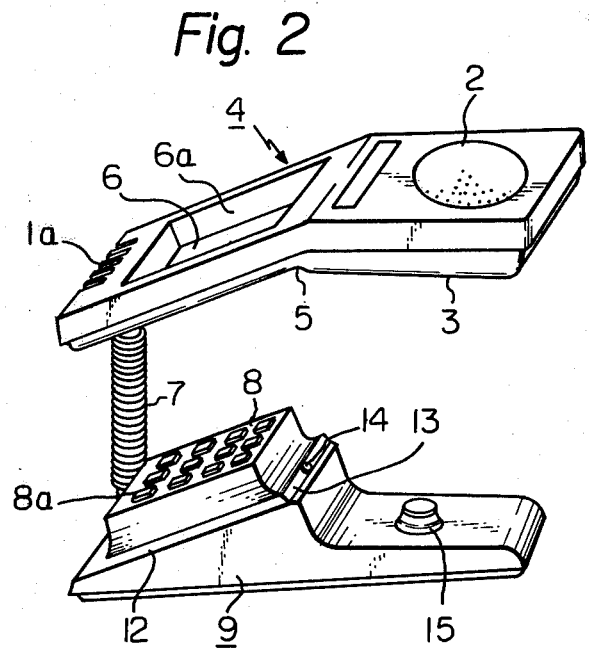
FIG. 2 is a perspective view showing the transmitter-receiver and a base member separated from each other.

The telephone set according to the invention shown in FIGS. 1-4 comprises a square-shaped rectangular transmitter-receiver 4 which is bent or inclined slightly downward from substantially at the center thereof to define a first portion (the portion shown on the leftside of the bending edge 5 in FIG. 1) and a second portion (the portion shown on the rightside of the bending edge 5 in FIG. 1). The transmitter-receiver is provided at the outer end of the first portion with a microphone compartment wherein a microphone 1 is mounted. In the second portion, a speaker compartment 10 has mounted therein a loudspeaker 2 and an earphone 3, the loudspeaker 2 being mounted on the upper side of the speaker compartment, and the earphone 2 being mounted on the lower side of the speaker compartment. The transmitter-receiver 4 also has in the first portion a square through-opening 6. Both side walls 6a of the opening connect the microphone room to the bending edge 5 and hence to the second portion. The telephone set further comprises a base member 9 shaped to support the transmitter-receiver 4 and which has a telephone number operating board 8 that is connected to the transmitter-receiver 4 by means of a cord 7 and which is further adapted to fit into the opening 6 of the transmitter-receiver. The speaker compartment 10 has an intercepting wall 11a at the bending edge 5. The transmitter-receiver 4 consists of an upper casing 4a and a lower casing 4b conjoined through a sound insulating packing 11 fitted into a groove 10a formed along the peripheral wall portion of the lower casing constituting the speaker compartment 10.

Figure 5:
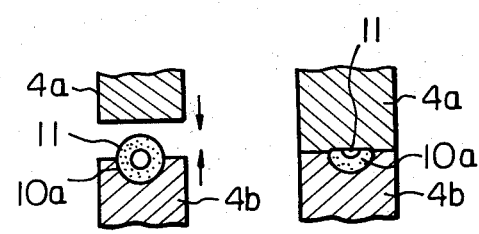
FIG. 5 is an sectional view showing the junction state along line B—B in FIG. 4.

The packing 11, which is provided to reduce the sound coupling between the microphone and the speaker through the inner side of the casing of the transmitter-receiver 4, is either a hollow elastic body consisting of, for example, a hollow tubular endless cord of silicone or an endless cord of independently foamed synthetic resin, the packing 11 being pressed into the groove 10a in either the upper or the lower edge of the casing (FIG. 5).

The base member 9 has an inclined portion 12 at the same angle as an angle at which, when the second portion or the speaker room 10 portion of the transmitter-receiver 4 is made level, the first portion thereof inclines downward. From the inclined portion 12, a telephone number operating board 8 of trapezoidal box-shape projects. On one side of the operating board 8, that is, on the center of the base member 9, there is a stepped portion 13, from the center of which projects a speaker-/earphone changeover switch 14. At the center of the side opposite the operating board 8 on the base member 9 is a projection 15 for supporting the transmitter-receiver 4. In the drawings, reference numeral 1a represents sound holes in the microphone 1, so that transmission is possible even from the upper side at the end portion of the transmitter-receiver 4. Necessary telephone circuit components are housed in a trapezoidal box body which forms the operating board 8.

The most general method of using the telephone set of this invention constructed as mentioned above comprises lifting the transmitter-receiver 4 and putting on the earphone 3 to the user's ear, operating the pushbuttons 8a. The lifting of the transmitter-receiver 4 causes the changeover switch 14 to break the circuit to the speaker 2, thus leaving only the earphone 3 and the microphone 1 energized, so that general lowspeaking is made possible. On the other hand, if the telephone set is used when the transmitter-receiver 4 is left in place, then the circuit of the earphone 3 is broken using the changeover switch 14, so that loudspeaking by the speaker 2 is possible.

The microphone 1 may be supported by a unique supporting member which will be described later in conjunction with FIGS. 6-10. This supporting member is constructed to be capable of preventing irregularities in characteristics such as a resonance point, etc. in production and thereby be easily mass-produced with the resonance point uniformly set at a fixed value.

As is well known, as a microphone becomes smaller in size and lighter in weight (like an electric capacitor microphone), the resonance point thereof tends to become higher when such a microphone is incorporated into an apparatus. If this resonance point is set at a level lower than an audio frequency or a level lower than the sound band of a speaker to be used, then it is possible to prevent howling due to resonance noise from the outside or due to sound which comes from within the apparatus. For example, a microphone when incorporated into a transmitter-receiver of a loudspeaking telephone set is apt to produce howling from a vibration noise transmitted from the base on which the microphone is mounted or sound which comes from the receiving speaker side, and, therefore, it is specially necessary to lower the resonance point.

For this reason, heretofore, a small-sized microphone supporting structure has been usually formed such that the microphone unit is encircled with a sponge body, for example, foamed polyurethane or the like, and is then incorporated into an apparatus so that it is supported softly, thus lowering the resonance point. This is, however defective in that, if a microphone unit is separately covered with a urethane foam and is then incorporated into a microphone compartment, it is unfit for mass production, because, in production, the characteristics vary so widely that it is difficult to make all the microphones uniform in resonance point.

Further, there is a supporting method wherein the whole microphone is inserted into a cylindrical elastic body made of rubber or the like, which is then fixed in the state of its being extended rearward and then bent forward, but this method is defective in that it is necessary to impart a mass to the microphone, which, is in some cases unfit for small-sized microphones, and furthermore, the microphone lead wire vibrates and become a load on the microphone unit, and so forth.

Generaly speaking, the resonance point of a microphone unit incorporated into an apparatus casing is generally expressed by $$\omega = \sqrt{k/m}$$

ω: number of inherent vibrations
k: spring constant
m: mass according to which it is known that the greater the mass of a microphone unit and the more softly it is supported (the smaller the spring constant k), the lower the resonance point becomes.

Figure 3:
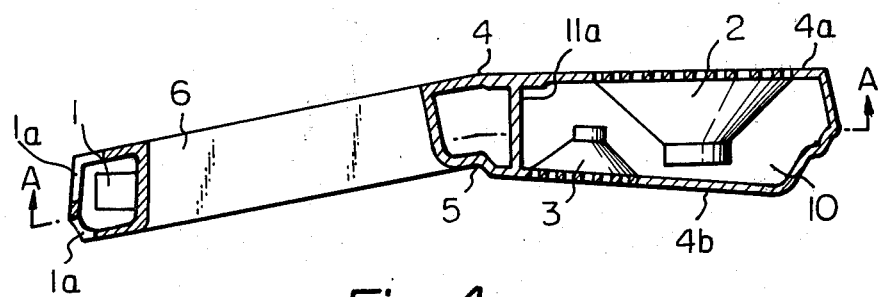
FIG. 3 is a longitudinal-sectional view of the transmitter-receiver.
Figure 4:
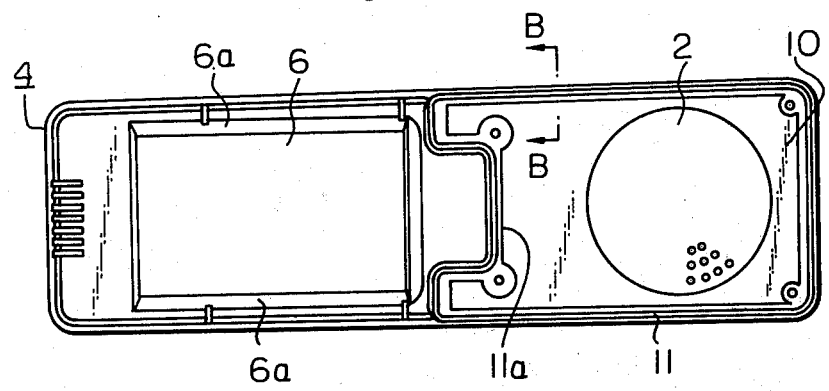
FIG. 4 is a sectional view taken along line A—A in FIG. 3.
Figure 6:
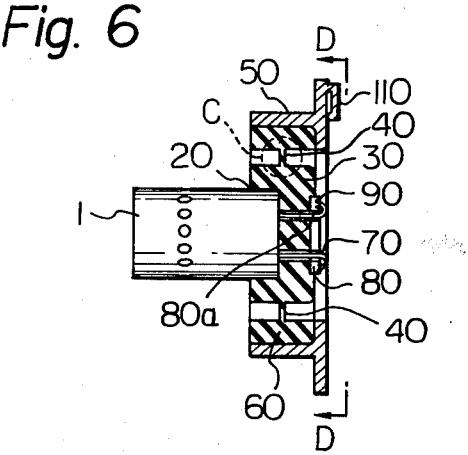
FIG. 6 is an enlarged view of the left end portion of FIG. 3.

Referring now to FIG. 6 which corresponds to an enlarged view of the left end portion of FIG. 3, the microphone 1 is supported by a supporting member formed on an elastic material such as silicone rubber or the like, and the supporting member comprises a thick portion 30 with a recess 20 therein into which the rear end portion of the microphone unit 1 can be fitted and fixed. Further, an extremely thin edge portion 40 is formed around this thick portion 30, and a thick flange portion 60 is provided for fixing the peripheral portion of the edge portion 40 to an apparatus casing 50 or to the wall of the microphone compartment. Lead wires 70 of the microphone unit 1 pass through the thick portion 30 of the supporting member and lead hole 80a of a printed plate board 80 provided at the back of the thick portion 30 and is bent, the bent portion being soldered. In this manner the microphone unit 1 is fixed to the printed plate board 80 with the elastic supporting member interposed therebetween. Further, to this soldered portion 90 are connected connecting lines 100. These connecting lines 100 are loosened to some extent (in order to prevent vibrations from being transmitted as a load on the microphone unit 1), are held with a cord holding member 110 integrally formed with the apparatus casing 50, and are thereafter drawn out.

Figure 7:
FIG. 7 is a sectional view showing a modification of the portion encircled with a chain line circle C in FIG. 3.
Figure 8:
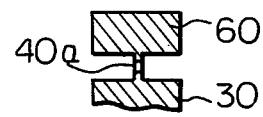
FIG. 8 is a sectional view showing another modification of the same.
Figure 9:
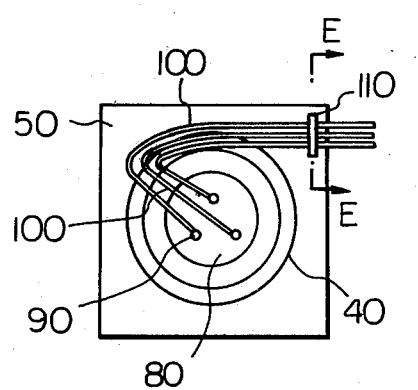
FIG. 9 is a back view seen from D—D arrow direction in FIG. 6.
Figure 10:
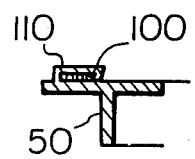
FIG. 10 is a sectional view taken along line E—E in FIG. 9.

The thinner the thin edge portion 40 of the supporting member consisting of elastic material, the smaller the spring constant k, so that the resonance point can be lowered. But, because there are disadvantages in mechanical strength and processibility, it is desirable to support the microphone unit 1 as softly as possible by making the edge portion 40 wavy or by making a plurality of openings 40a, as shown in FIG. 7 and FIG. 8. Also, it is desirable that the same degree of softness be held in all directions with respect to the microphone unit 1, and on this point, the optimum value is set depending upon the quality of the elastic material, the thickness and the shape of the edge portion 40, etc.

According to one tested example, when the mass of the microphone unit 1 was 1.5 g, the weight of the thick portion which serves as a weight portion of the elastic material was 4.5 g and the thickness of the thin edge portion was 0.2 mm, the resonance point obtained was 30 Hz. This is practically outside the audio frequency range (about 300–3 kHz), and, therefore, is fully satisfactory result with respect to a vibration noise from the apparatus casing and howling.

As seen from the foregoing the telephone set of this invention not only reduces howling because the sound coupling between the microphone and the speaker through the inner side of the transmitter-receiver casing is effected by only the side walls of the opening 6, it further increases this effect because the speaker compartment 10 is entirely surrounded by the packing 11. Particularly, the packing 11 which consists of the hollow elastic body is highly effective for sound insullation because its inner side is hollow. Therefore, even if the upper and lower casings 4a and 4b are not strongly conjoined, the hollow portion can be compressed readily to put the speaker compartment into a good hermetically-sealed state and, at the same time, prevent undesirable vibrations such as "chattering" etc. at the junction therebetween. Furthermore with the packing, it is possible to make the speaker room into a waterproof, airtight construction.

The transmitter-receiver has a square opening, and, therefore, makes a good fit with the operating board of the base member to give the impression that the two are integral. This is another advantage.

Further, a distinct advantage is produced since the operating board can be freely operated either when the transmitter-receiver is placed on the base member or when the two are separated and the transmitter-receiver is being held.

The supporting member for supporting the microphone unit shown in FIGS. 6–10 is advantageous in that supporting members which are uniform are possible by simultaneously forming with resin, and, therefore, if a microphone unit is supported to such a supporting member, the supporting member is mounted onto the apparatus casing. Thereafter, the apparatus casing is incorporated into the microphone compartment of a transmitter-receiver or the like, and this is very suitable for mass production because, in production, the characteristics (particularly, resonance point) rarely vary, thus uniformly setting the resonance point at a fixed value. Furthermore, the microphone unit and the printed plate board are coupled through lead wires, and the thick portion which serves as a weight of the elastic supporting member is interposed therebetween, so that elastic material is utilized as a weight for lowering the resonance point. Also, the parts are connected to one another through the elastic material, so that it is possible and absorb undesirable vibrations to suppress the occurrence thereof. Moreover, construction and assembling are simple, and the connecting lines from the printed plate board are smoothly bent, held with the holding member formed integrally with the casing and thereafter drawn out, so that the connecting lines avoid becoming a load on the microphone unit. Finally if only the connecting lines are held with the holding member, cord bandages, etc. are dispensed with and the formation operation is extremely simplified.

It is to be understood that numerous variations in the design and construction of the telephone set described herein are possible within the intended scope of the invention and the invention is by no means to be limited or confined to the illustrated embodiments thereof. For example, the changeover switch 14 may be positioned at a place other than the position shown in the specification and drawing, for example, on the projection 15 which supports the transmitter-receiver 4, or may be an operating button formed on the operating board. Also, the shape of the base member may be such that the operating board fixed onto the inclined portion is separable from the remaining portion. It is felt, therefore, that this invention should not be restricted to the proposed embodiments.

What is claimed is:

1. A combined loudspeaking and lowspeaking telephone set comprising:
    a transmitter-receiver, said transmitter-receiver having:
        a slightly bent portion at the center thereof,
        a first portion on one side of said bent portion, said first portion having a microphone compartment therein and an opening therethrough, the sides of said opening connecting said microphone compartment to said bent portion, and
        a second portion on the side of said bent portion opposite said first portion, said second portion having a speaker compartment therein;
    microphone means in said microphone compartment for receiving sound waves;
    speaker means in said speaker compartment for selectively delivering both loudspeaking and lowspeaking sound waves;
    a base member shaped to receive said transmitter-receiver thereon, said base member having an inclined portion and a telephone number operating board projecting from said inclined portion; and
    said opening through said first portion being removably fitted over and around said projecting operating board, whereby positioning said opening over and around said operating board permits access to said operating board through said opening and allows said first portion to rest on said inclined portion of said base member.

2. A telephone set as claimed in claim 1, wherein said speaker means is comprised of:
    a loudspeaker adjacent the upper surface of said speaker compartment; and
    an earphone for lowspeaking positioned against the lower surface of said speaker compartment of said transmitter-receiver.

3. A telephone set as claimed in claim 1,
    wherein a stepped portion is formed on one side of said inclined portion of said telephone number operating board at substantially the central portion of said base member; and
    further comprising loudspeaking/lowspeaking mode changeover switch means projecting from said stepped portion for switching said speaker means between loudspeaking and lowspeaking in conjunction with the positioning of said first portion around said number operating board on said stepped portion of said inclined portion.

4. A telephone set as claimed in claim 1, wherein an intercepting wall is provided in said second portion of said transmitter-receiver at said speaker compartment for hermetically sealing said speaker compartment.

5. A telephone set as claimed in claim 1, wherein said microphone means is comprised of:
    a microphone in said microphone compartment;
    a supporting member of elastic material around the base of said microphone, said supporting member having:
        a first thickened portion fitted around the bottom of said microphone,
        a second thick flange portion surrounding and spaced from said first thickened portion and fixed to the inside wall of said microphone compartment, and
        a third edge portion extending between and connecting said first and second portions;

lead wires connected to said microphone and extending through said first thickened portion;
a printed plate board adjacent said first thickened portion connected to said wires extending through said first thickened portion; and
connecting wires connected to and leading from said printed plate board.

6. A telephone set as claimed in claim 5, wherein said third edge portion has a wavy configuration.

7. A telephone set as claimed in claim 5, wherein said third edge portion has a plurality of openings therethrough.

8. A telephone set as claimed in claim 1, wherein: said transmitter-receiver is comprised of an upper casing and a lower casing fitted to said upper casing, one of said casings having a recessed groove therein around the circumference of said speaker compartment; and
a packing material is fitted into said groove between said upper and lower casings around said speaker compartment, whereby said speaker compartment is sealed when said casings are fitted together.

9. A telephone set as claimed in claim 8, wherein said packing material is comprised of a silicone resin the the form of an endless hollow tube.

* * * * *